W. W. SIMMONS.
CARRIAGE-AXLE.

No. 169,856. Patented Nov. 9, 1875.

Witnesses:
J. W. Shumway
Clara Broughton

Wm. W. Simmons.
Inventor
By Atty
John E. Earle

UNITED STATES PATENT OFFICE.

WILLIAM W. SIMMONS, OF DERBY, CONNECTICUT.

IMPROVEMENT IN CARRIAGE-AXLES.

Specification forming part of Letters Patent No. 169,856, dated November 9, 1875; application filed September 9, 1875.

*To all whom it may concern:*

Be it known that I, WILLIAM W. SIMMONS, of Derby, in the county of New Haven and State of Connecticut, have invented a new Improvement in Carriage-Axle; and I do hereby declare the following, when taken in connection with the accompanying drawings and the letters of reference marked thereon, to be a full, clear, and exact description of the same, and which said drawings constitute part of this specification, and represent in—

Figure 1:
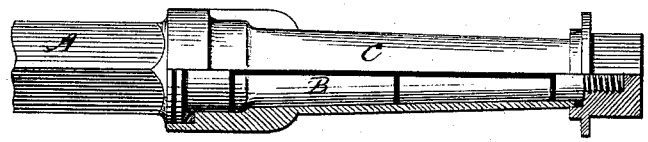
Figure 2:
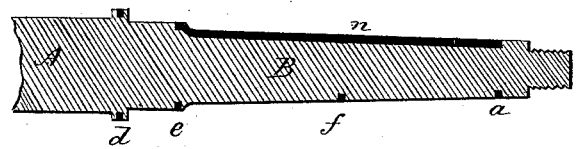
Figure 3:

Figure 1 a sectional side view; Fig. 2, longitudinal section of the axle-arm; Fig. 3, transverse section.

This invention relates to an improvement in the construction of carriage-axle arms, the object being to facilitate lubrication, and, at the same time, to prevent dust or other foreign substance from working into the axle-box; and it consists in constructing the axle with annular and longitudinal grooves, filled with a fibrous or absorbing material, as more fully hereinafter described.

A is the body of the axle; B, the arm; C, the box, which is of the usual construction. Near the tip of the arm is an annular groove, $a$, and on the collar a second similar annular groove, $d$, and intermediate between these extremes other annular grooves $e$ $f$. Combined with these is one or more longitudinal grooves, $n$, denoted in solid black in the several figures. These grooves are filled with a fibrous material, flush with the surface of the axle—that is, when inserted into the box; the natural elasticity of the material, however, if free, will raise it slightly above the surface, so as to insure the perfect packing between the axle and the box. This filling is thoroughly saturated with lubricating material, and the wheel placed upon the axle and secured in the usual manner. The packing of the two end grooves $a$ $d$ prevents any foreign substances from working onto the axle, and the intermediate packings $e$ $f$ prevent the lubricating material from working to either extreme of the axle, while the longitudinal packing distributes the lubrication around the box.

It will be understood that any absorbent will answer to fill the grooves.

I do not wish to be understood as broadly claiming the introduction of a fibrous material between the axle and the box, as such I am aware is not new.

I am aware that it is not new to employ an absorbing material to hold the lubricant on frictional bearings, and, therefore, I do not wish to be understood as broadly claiming such an arrangement.

I claim—

The carriage-axle, constructed with the combined annular and longitudinal grooves, filled with an absorbing material, substantially as and for the purpose described.

W. W. SIMMONS.

Witnesses:
JOHN E. EARLE,
CLARA BROUGHTON.